United States Patent

Dust et al.

[11] Patent Number: 4,830,951
[45] Date of Patent: May 16, 1989

[54] NAPHTHOLACTAMSQUARIC ACID DYES AND OPTICAL RECORDING MATERIALS CONTAINING THESE DYES

[75] Inventors: Matthias Dust, Mannheim; Peter Neumann, Wiesloch; Peter Hauser, Limburgerhof; Gerhard Wagenblast, Frankenthal; Heidi Benthack-Thoms, Limburgerhof; Helmut Barzynski, Bad Durkheim; Klaus D. Schomann, Ludwigshafen; Harald Kuppelmaier, Heidelberg, all of Fed. Rep. of Germany

[73] Assignee: BASF Aktiengesellschaft, Ludwigshafen, Fed. Rep. of Germany

[21] Appl. No.: 93,239

[22] Filed: Sep. 4, 1987

[30] Foreign Application Priority Data

Sep. 19, 1986 [DE] Fed. Rep. of Germany ....... 3631843

[51] Int. Cl.⁴ .......................... G11B 7/24; G01D 9/00; G03C 1/72; B41M 5/26
[52] U.S. Cl. .................................... 430/270; 430/495; 430/945; 346/135.1; 548/419; 548/436
[58] Field of Search ................ 548/436, 419; 430/270, 430/495, 945

[56] References Cited

U.S. PATENT DOCUMENTS

| | | | |
|---|---|---|---|
| 3,963,747 | 6/1976 | Schefczik et al. | 548/419 |
| 4,241,355 | 12/1980 | Bloom . | |
| 4,246,410 | 1/1981 | Schwander et al. | 548/436 |
| 4,508,811 | 4/1985 | Gravesteijn et al. | 430/270 |
| 4,656,121 | 4/1987 | Sato et al. | 430/495 |
| 4,756,987 | 7/1988 | Maeda et al. | 430/270 |

FOREIGN PATENT DOCUMENTS

| | | |
|---|---|---|
| 84729 | 12/1982 | European Pat. Off. . |
| 3608214 | 9/1987 | Fed. Rep. of Germany . |
| 35341 | 10/1973 | Japan . |
| 56892 | 3/1979 | Japan . |
| 112790 | 12/1981 | Japan . |
| 132231 | 2/1982 | Japan . |
| 125246 | 7/1983 | Japan . |

Primary Examiner—Paul R. Michl
Assistant Examiner—Mark R. Buscher
Attorney, Agent, or Firm—Oblon, Fisher, Spivak, McClelland & Maier

[57] ABSTRACT

Naphtholactamsquaric acid dyes of the formula

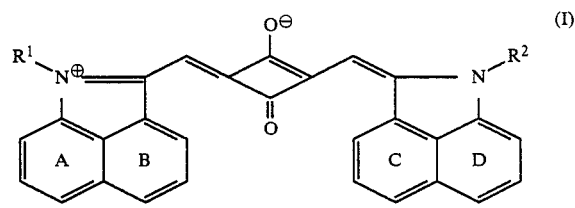

where $R^1$ and $R^2$ independently of one another are each unsubstituted or substituted $C_3$-$C_{22}$-alkyl, in which the alkyl chain may be interrupted by oxygen atoms, or are each unsubstituted or substituted $C_1$-$C_4$-aralkyl, unsubstituted or substituted $C_5$-$C_7$-cycloalkyl or unsubstituted or substituted phenyl, and the rings A, B, C and D are unsubstituted or substituted and/or benzofused, and optical recording materials consisting of a base and a layer which is sensitive to laser light and is composed of a thermoplastic or crosslinked polymer and one or more dyes (I).

Because of the high light absorption of (I), the recording materials are very sensitive to light from the GaAlAs semiconductor laser. An excellent signal-to-noise ratio is obtained on reading the recordings.

5 Claims, No Drawings

NAPHTHOLACTAMSQUARIC ACID DYES AND OPTICAL RECORDING MATERIALS CONTAINING THESE DYES

Optical recording materials which undergo localized changes of state when exposed to radiation of high energy density, eg. laser light, are known. These thermally induced changes of state are associated with changes in the optical properties and are utilized for information and data recording.

Thin layers of metal or alloys are used as recording materials for this type of information storage. However, these materials have a short service life since they are sensitive to oxidation and moisture.

For use as a storage medium, the amorphous layers must remain unchanged over long periods. Ageing processes, such as crystallization or fading owing to light and heat, as a result of which the morphology of the storage layer is changed, occur relatively frequently in thin layers applied by vapor deposition.

Other known optical storage systems are those which contain, as absorbing compounds, oxazines (JP-A No. 132 231/1983), cyanine dyes (JP-A Nos. 112 790/1983 and 125 246/1983), phthalocyanine compounds (EP-A No. 84 729, U.S. Pat. No. 4,241,355 and JP-A No. 56 892/1983) and 1,4-naphthoquinone compounds which carry substituents having a donor effect (JP-A No. 112 793/1983). These stores can be written on using an He—Ne laser (633 nm).

Numerous recording materials for use with semiconductor injection lasers have also been described. In particular, phthalocyanine compounds, methine dyes and squaric acid derivatives are used here as organic IR dyes.

It is an object of the present invention to provide novel naphtholactamsquaric acid dyes which are suitable for the production of optical recording materials.

We have found that this object is achieved by naphtholactamsquaric acid dyes of the formula

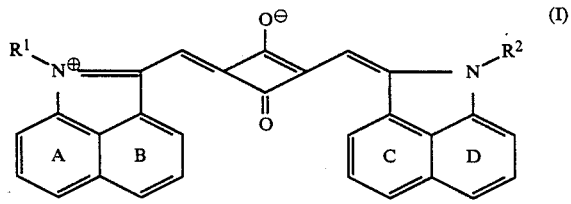

where $R^1$ and $R^2$ independently of one another are each unsubstituted or substituted $C_3$–$C_{22}$-alkyl, in which the alkyl chain may be interrupted by oxygen atoms, or are each unsubstituted or substituted $C_1$–$C_4$-aralkyl, unsubstituted or substituted $C_5$–$C_7$-cycloalkyl or unsubstituted or substituted phenyl, and the rings A, B, C and D are unsubstituted or substituted and/or benzofused.

All alkyl groups occurring in the abovementioned radicals can be either straight-chain or branched.

Specific examples of $C_3$–$C_{22}$alkyl radicals $R^1$ and $R^2$ which are unsubstituted or substituted by phenyl, halogen, $C_1$–$C_4$-alkanoyl, carboxyl, $C_1$–$C_4$-alkanoylamino, $C_1$–$C_4$-alkoxycarbonyl, $C_1$–$C_4$-alkoxycarbonylamino or $C_1$–$C_4$-alkylanilino and in which the alkyl chain may be interrupted by oxygen atoms are n-propyl, isopropyl, n-butyl, isobutyl, tert-butyl, n-pentyl, 2-methylbutyl, n-hexyl, 2-methylpentyl, n-heptyl, n-octyl, 2-ethylhexyl, isooctyl, nonyl, isononyl, decyl, isodecyl, dodecyl, undec-10-ene-1-yl, 3,5,5,7-tetramethylnonyl, isotridecyl, pentadecyl, hexadecyl, heptadecyl, octadecyl, nonadecyl, eicosyl, docosyl (the names isooctyl, isononyl, isodecyl and isotridecyl are trivial names originating from the alcohols obtained by oxo synthesis; cf. Ullmann, Enzyklopädie der Technischen Chemie, 4th Edition, Volume 7, pages 216 and 217, and Volume 11, pages 435 and 436), heptafluoropropyl, 2-methoxyethyl, 2-ethoxypropyl, 3-ethoxypropyl, 3,6-dioxaheptyl, 3,6-dioxaoctyl, 3,6,9-trioxadecyl, propan-2-on-1-yl, butan-3-on-1-yl, 2-ethylpentan-3-on-1-yl, 2-carboxyethyl, 3-carboxypropyl, 4-carboxybutyl, 5-carboxypentyl, 4-carboxy-3-oxabutyl and 3-(methoxycarbonyl)propyl.

Examples of $C_2$–$C_4$-aralkyl are benzyl, 2-phenylethyl and 2- and 3-phenylpropyl.

Examples of $C_5$–$C_7$-cycloalkyl radicals $R^1$ and $R^2$ which are unsubstituted or substituted by $C_1$–$C_4$-alkyl or halogen are cyclopentyl, cyclohexyl, cycloheptyl, 3-methylcyclopentyl, 4-ethylcyclohexyl and 2,3-dichlorocyclohexyl. Suitable phenyl radicals are phenyl and phenyl which is substituted by $C_1$–$C_4$-alkyl, $C_1$–$C_4$-alkoxy, halogen or $C_1$–$C_4$-dialkylamino, eg. 4-methylphenyl, 4-isopropylphenyl, 4-methoxyphenyl, 2,4-dimethoxyphenyl, 2-chlorophenyl, 4-bromophenyl or 4-dimethylaminophenyl.

The rings A, B, C and D in formula I can be unsubstituted or substituted, for example, by $C_1$–$C_{22}$-alkyl which is unsubstituted or substituted by phenyl, halogen, $C_1$–$C_4$-alkanoyl, carboxyl, $C_1$–$C_4$-alkanoylamino, $C_1$–$C_4$-alkoxycarbonyl, $C_1$–$C_4$-alkoxycarbonylamino or $C_1$–$C_4$-alkylanilino and in which the alkyl chain may be interrupted by oxygen atoms, by phenyl, $C_1$–$C_{22}$-alkoxy, $C_1$–$C_{20}$-alkylthio, halogen, nitro, cyano, $C_1$–$C_4$-mono- or dialkylamino, 1-azacycloalkyl, $C_1$–$C_4$-alkylsulfonyl, $C_1$–$C_4$-alkoxysulfonyl, phenylsulfonyl, $C_1$–$C_4$-alkylphenylsulfonyl, hydroxysulfonyl, anilino, $C_1$–$C_4$-alkylanilino, $C_1$–$C_4$-alkanoyl, $C_1$–$C_4$-alkanoylamino, $C_1$–$C_4$-alkoxycarbonyl, $C_1$–$C_4$-alkoxycarbonylamino, carbamyl, $C_1$–$C_4$-N-mono- or $C_1$–$C_4$-N,N-dialkylcarbamyl, sulfamyl, $C_1$–$C_4$-N-mono- or N,N-$C_1$–$C_4$-dialkylsulfamyl, ureido, $C_1$–$C_4$-alkyl-substituted ureido, phenoxy, phenylthio or the radical

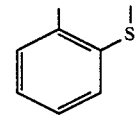

or benzofused.

1-Azacycloalkyl radicals are, for example, 5-membered to 7-membered saturated nitrogen heterocycles which are bonded via nitrogen and can contain further hetero atoms. Specific examples are

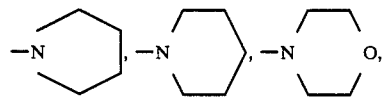

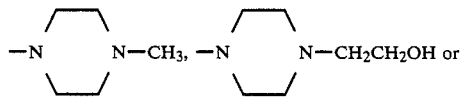

Examples of substitution patterns in the naphtholactam system are:

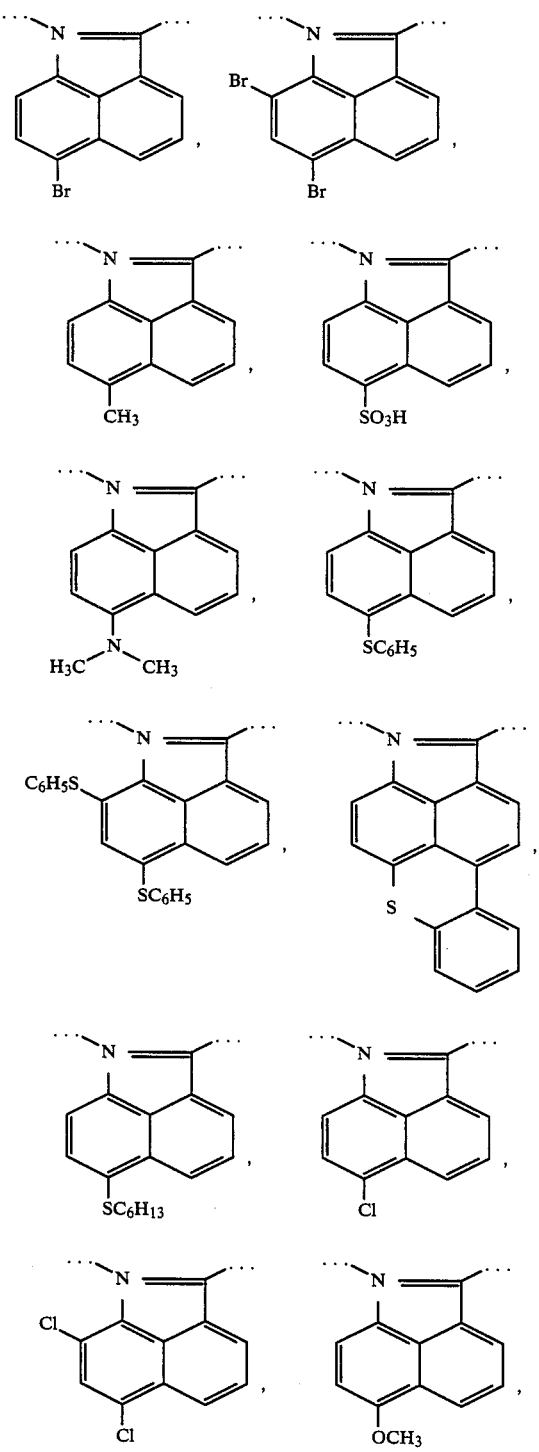

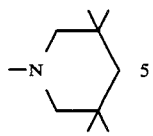

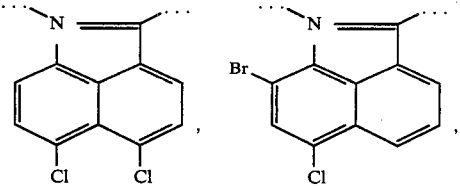

Preferred naphtholactamsquaric acid dyes (I) are those in which $R^1$ and $R^2$ are each $C_6-C_{22}$-alkyl, in particular $C_{12}-C_{22}$-alkyl, 2-methoxyethyl, 2,3,3-trimethyl-4-hydroxybutyl, 2-ethoxyethyl, 2-n-butoxyethyl, 2-benzyloxyethyl, 2-hydroxyethyl, 8-hydroxyoctyl, 3,6-dioxaheptyl, 3,6-dioxaoctyl, 3,6-dioxadecyl, 3,6-dioxa-7-phenylheptyl, 3,6-dioxahexyl, 3,6,9-trioxadecyl, 3,6,9-trioxaundecyl, 3,6,9-trioxatridecyl, 3,6,9-trioxa-10-phenyldecyl or 3,6,9-trioxa-10-hydroxydecyl, benzyl or undec-10-en-1-yl and one of the rings A or B and C or D is unsubstituted or substituted by $C_1-C_{22}$-alkyl, 1,3-dioxabutyl, 1,3-dioxapentyl, 1,3-dioxaheptyl, 1,3-dioxa-4-phenylbutyl, 1,3-dioxapropyl, 1,3,6-trioxaheptyl, 1,3,6-trioxaoctyl, 1,3,6-trioxadecyl, 1,3,6-trioxa-7-phenylheptyl, 1,3,6-trioxahexyl, 1,3,6,9-tetraoxadecyl, 1,3,6,9-tetraoxaundecyl, 1,3,6,9-tetraoxatridecyl, 1,3,6,9-tetraoxa-10-phenyldecyl, 1,3,6,9-tetraoxa-10-hydroxydecyl, phenyl, $C_1-C_{22}$-alkoxy, $C_1-C_{10}$-alkylthio, cyano, $C_1-C_{16}$-mono- or $C_1-C_{16}$-dialkylamino, 1-azacycloalkyl, chlorine, bromine, hydroxysulfonyl, phenylthio or the radical

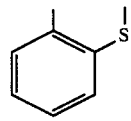

Particularly preferred naphtholactam dyes (I) are those in which $R^1$ and $R^2$ are each $C_{12}$–$C_{22}$-alkyl, benzyl, undec-10-en-1-yl, 3,6-dioxahexyl, 3,6-dioxaheptyl, 3,6-dioxadecyl, 3,6-dioxa-7-phenylheptyl, 3,6,9-trioxadecyl, 3,6,9-trioxatridecyl or 8-hydroxyoctyl, and the rings A, B, C and D are unsubstituted.

The novel dyes are prepared by condensing a cycloammonium compound of the formula II

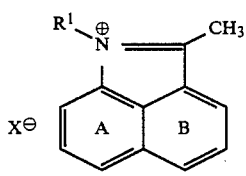

where $R^1$, A and B have the abovementioned meanings and X is I, Cl or Br, with squaric acid in a solvent at from 20° to 120° C.

The cyclammonium compounds of the formula II which are required as starting materials are known or can be prepared by a conventional method.

Examples of suitable solvents for the reactions are toluene, butanol, propanol and mixtures of these.

The naphtholactamsquaric acid dyes of the formula I have a very high molar absorption in the range from 700 to 1200 nm. They are readily soluble in organic solvents and/or thermoplastics or crosslinked plastics.

The present invention furthermore relates to optical recording materials consisting of a base and a dye layer or a layer of a thermoplastic or crosslinked polymer which contains a dye which is sensitive to laser light, the polymer containing one or more naphtholactam dyes of the formula I.

The novel recording systems have a very high absorption at the wavelength of the semiconductor lasers, ie. about 750–950 nm. The polymer layers can be applied to a light-reflecting layer to give smooth absorption layers of high optical quality which have an advantageous threshold energy and in which the information to be stored can be written with a high signal-to-noise ratio.

The recording materials according to the invention can be written on and read by means of a semiconductor laser and are very stable to atmospheric influences and daylight.

Because of the high light absorption of the dyes, the novel recording materials are very sensitive to the light of the GaAlAs semiconductor laser.

The heat evolved during absorption of the laser light causes the thermoplastic to flow radially outward and thus results in the formation of holes having crisp edges, so that an excellent signal/noise ratio is obtained.

The composition of the recording materials is known per se [J. Vac. Sci. Technol. 18 (1) Jan./Feb. 1981, page 105].

A reflecting layer can be present between the light-absorbing layer and the base, so that the incident light passing through the colored layer (ie. the light which is not absorbed) is reflected at the reflector layer and again passes through the colored layer.

Exposure can also be effected through a transparent substrate. In this case, a suitable layer sequence is the arrangement substrate—absorber layer—if appropriate, reflector layer.

Examples of suitable light-reflecting materials are aluminum, rhodium, gold, tin, lead, bismuth, copper and dielectric mirrors. The light-reflecting layer should be sufficiently thick for the light used for recording or for reading to be reflected as completely as possible.

Mirrors having low thermal conductivity are advantageous for this purpose. The base and the light-reflecting layer must have an optically smooth, even surface and the latter should be such that the absorbing layer adheres firmly to it. In order advantageously to influence the surface quality and the adhesion properties, the base and/or the reflector can be provided with a subbing layer of a heat-setting plastic or thermoplastic material.

The metallic reflecting layers are preferably applied in a conventional manner by vapor deposition under reduced pressure or by applying suitable metal foils to the base. The novel layer which is sensitive to laser light is preferably applied by spin-coating using dissolved or dispersed dye in the presence of a binder. Other suitable methods for producing the layers are knife coating and immersion.

To apply the absorption layers from solution, a solution or, if appropriate, a dispersion of the dye or dye mixture, with the polymer as a binder, is prepared in a suitable solvent, such as methylene chloride, chloroform, carbon tetrachloride, acetone, methyl ethyl ketone, cyclohexanone, toluene, acetonitrile, ethyl acetate, methanol or a mixture of these solvents.

Suitable binders are either radiation-curable or heat-curable resins, for example photopolymers, silicone resins and epoxy resins, or thermoplastics.

Thermoplastics which are noncrystalline or have very low crystallinity and glass transition temperatures >35° C., in particular >75° C., are preferred. Furthermore, the binders, such as resins or thermoplastics, must be compatible with the naphtholactam dyes of the formula I. Examples of suitable binders are water-insoluble binders having a high dissolving power for the naphtholactam dyes, eg. (meth)acrylate polymers and copolymers, polystyrene homopolymers and copolymers, polyvinylcarbazole, polyvinyl ester copolymers, polyvinyl chloride and cellulose esters.

The dye formulation is applied by knife coating or immersion or preferably by spin-coating, to a subbing layer which has been cleaned beforehand or pretreated, and the layer is dried or cured in the air. The film can also be dried or cured under reduced pressure, at elevated temperatures or, if appropriate, with radiation.

Depending on the composition of the system, the dye-in-polymer layer is first applied, followed by the reflector, or vice versa. If appropriate, the application of intermediate and protective layers or of a reflecting layer can be dispensed with.

If it is impossible to dispense with intermediate layers, the thickness of the intermediate layer must be chosen so that no troublesome interference can occur, the refractive index of the material used for this purpose and the laser light wavelength employed being taken into account.

If the dye-in-polymer layer does not possess sufficient mechanical stability, it can be covered with a transparent protective layer. This can be done using a number of polymers, which can be applied in dissolved form by spin-coating, knife coating or immersion using dissolved polymers, or by vapor deposition under reduced pressure, for example with fluorinated polymers.

If the system (data store) consists of two identical or different recording materials in the form of a sandwich, a protective layer can be dispensed with. In addition to greater mechanical and rotational-dynamic stability, the sandwich structure has the advantage of twice the storage capacity.

The Examples which follow illustrate the invention.
DAA = diacetone alcohol
THF = tetrahydrofuran
DMF = N,N-dimethylformamide
PMMA = polymethyl methacrylate
A. Preparation of the dyes

EXAMPLE 1

650 mg (5.7 millimoles) of squaric acid are dissolved in 40 ml of butanol and 40 ml of toluene at elevated temperatures. Thereafter, 5.01 g (11.4 millimoles) of 1-dodecyl-2-methylbenzo[c,d]indolium iodide are added and the mixture is refluxed for 2 hours. The reaction solution is evaporated down in a rotary evaporator, the residue is stirred with 100 ml of acetone at 0° C. for 2 hours and the product is filtered off under suction. The resulting red powder is stirred for 2 hours with butan-2-one at 0° C., filtered off under suction and washed with ether.

Yield: 2.4 g of the dye of the formula

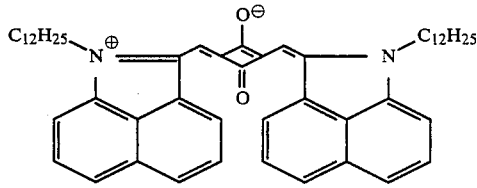

Absorption maximum: 879 nm (DAA)

EXAMPLES 2 TO 17

The dyes shown in the Table below were prepared similarly to Example 1. The solvent used in the determination of the absorption maximum is stated in parentheses after the wavelength.

| Example | Dye | $\lambda_{max}$ [nm] |
|---|---|---|
| 2 | (structure with $C_6H_{13}$ groups) | 865 (EtOH) |
| 3 | (structure with $C_{18}H_{37}$ groups) | 866 (EtOH) |
| 4 | (structure with $C_{22}H_{45}$ groups) | 892 (THF) |
| 5 | (structure with hydroxyethoxyethyl groups) | 865 (EtOH) |

-continued

| Example | Dye | λmax [nm] |
|---|---|---|
| 6 | | 878 (DAA) |
| 7 | | 878 (DAA) |
| 8 | | 888 (THF) |
| 9 | | 893 (DMF) |

-continued

| Example | Dye | λmax [nm] |
|---------|-----|-----------|
| 10 | | 890 (THF) |
| 11 | | 865 (EtOH) |
| 12 | | 865 (EtOH) |
| 13 | | 884 (THF) |

-continued
| Example | Dye | λmax [nm] |
|---|---|---|
| 14 | ![dye 14] | 890 (THF) |
| 15 | ![dye 15] | 870 (EtOH) |
| 16 | ![dye 16] | 891 (THF) |
| 17 | ![dye 17] | 895 (THF) |
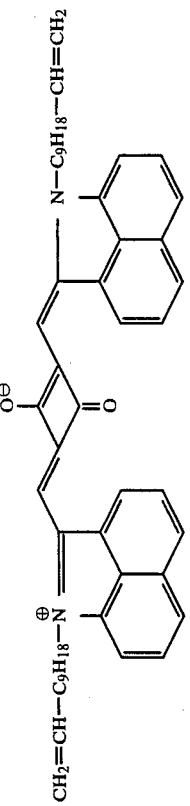
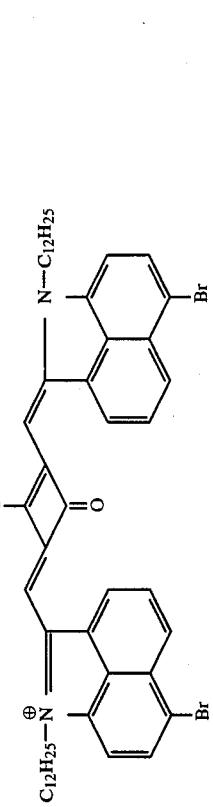
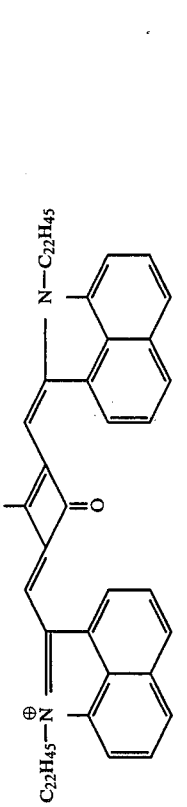
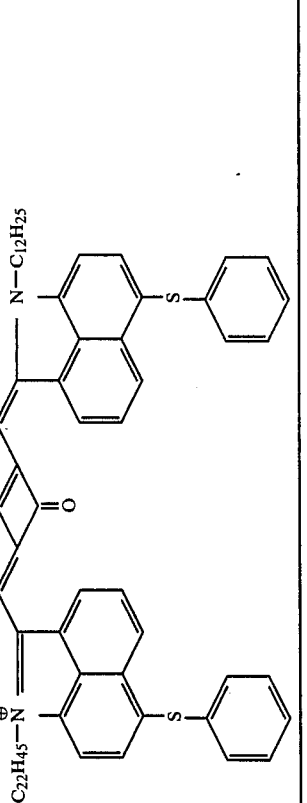

B. Preparation of the optical recording material 0.0866 g of high molecular weight PMMA are dissolved in 0.346 g of ethyl acetate, and 0.202 g of dye no. 7 and 6.56 g of toluene are added. Stirring is carried out for 1 hour, after which the saturated solution is filtered and applied to the PMMA substrate by spin coating at 2,000 rpm. The homogeneous layer is 80 nm thick and has a broad absorption band with a maximum at 800 nm. The extinction at 830 nm is 0.5. Individual holes about 1 μm in size are written in the active layer using an AlGaAs laser (λ=820 nm) mounted on a turntable. The sensitivity of the layer is better than 1 nJ/hole; when the points are read, an excellent signal/noise ratio is found.

We claim:

1. A naphtholactamsquaric acid dye of the formula (I):

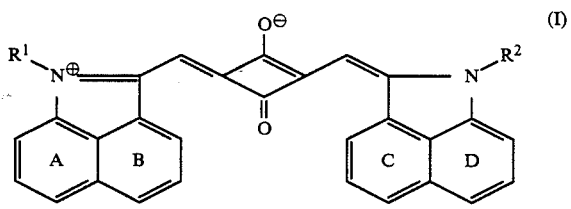

wherein $R^1$ and $R^2$ independently of one another are each (a) $C_3$–$C_{22}$-alkyl; (b) $C_3$–$C_{22}$-alkyl which is substituted by phenyl, halogen, $C_1$–$C_4$-alkanoyl, carboxyl, $C_1$–$C_4$-alkanoylamino, $C_1$–$C_4$-alkoxycarbonyl, $C_1$–$C_4$-alkoxycarbonylamino or $C_1$–$C_4$-alkylanilino in which $C_3$–$C_{22}$-alkyl chain is uninterrupted or is interrupted by oxygen atoms; (c) benzyl, 2-phenylethyl or 2- or 3-phenylpropyl; (d) $C_5$–$C_7$-cycloalkyl; (e) $C_5$–$C_7$-cycloalkyl which is substituted by $C_1$–$C_4$-alkyl or halogen; or (f) phenyl, and the rings A, B, C and D are unsubstituted or substituted by $C_1$–$C_{22}$-alkyl, which are unsubstituted or substituted by phenyl, halogen, $C_1$–$C_4$-alkanoyl, carboxyl, $C_1$–$C_4$-alkanoylamino, $C_1$–$C_4$-alkoxycarbonyl; $C_1$–$C_4$-alkoxycarbonylamino or $C_1$–$C_4$-alkylanilino, or are substituted by phenyl, $C_1$–$C_{22}$-alkoxy, $C_1$–$C_{20}$-alkylthio, halogen, nitro, cyano, $C_1$–$C_4$-mono- or a dialkylamino, 1-azacycloalkyl, $C_1$–$C_4$-alkylsulfonyl, $C_1$–$C_4$-alkoxysulfonyl, phenylsulfonyl, $C_1$–$C_4$-alkylphenylsulfonyl, hydroxysulfonyl, anilino, $C_1$–$C_4$-alkylanilino, $C_1$–$C_4$-alkanoyl, $C_1$–$C_4$-alkanoylamino, $C_1$–$C_4$-alkoxycarbonyl, $C_1$–$C_4$-alkoxycarbonylamino, carbamyl, $C_1$–$C_4$-N-mono- or $C_1$–$C_4$-N, N-dialkylcarbamyl, sulfamyl, $C_1$–$C_4$-N-mono- or N,N-$C_1$–$C_4$-dialkyl sulfamyl, ureido, $C_1$–$C_4$-alkyl-substituted ureido, phenoxy, phenylthio or the radical:

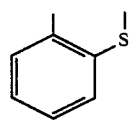

2. The naphtholactamsquaric acid dye as claimed in claim 1, wherein $R^1$ and $R^2$ independently of one another are each $C_6$–$C_{22}$-alkyl, 2-methoxyethyl, 2,3,3-trimethyl-4-hydroxybutyl, 2-ethoxyethyl, 2-n-butoxyethyl, 2-benzyloxyethyl, 2-hydroxyethyl, 8-hydroxyoctyl, 3,6-dioxaheptyl, 3,6-dioxaoctyl, 3,6-dioxadecyl, 3,6-dioxa-7-phenylheptyl, 3,6-dioxahexyl, 3,6,9-trioxadecyl, 3,6,9-trioxaundecyl, 3,6,9-trioxatridecyl, 3,6,9-trioxa-10-phenyldecyl or 3,6,9-trioxa-10-hydroxydecyl, benzyl, or undec-10-en-1-yl, and one of the rings A or B or C or D is unsubstituted or substituted by $C_1$–$C_{22}$-alkyl, 1,3-dioxabutyl, 1,3-dioxapentyl, 1,3-dioxaheptyl, 1,3-dioxa-4-phenylbutyl, 1,3-dioxapropyl, 1,3,6-trioxaheptyl, 1,3,6-trioxaoctyl, 1,3,6-trioxadecyl, 1,3,6-trioxa-7-phenylheptyl, 1,3,6-trioxahexyl, 1,3,6,9-tetraoxadecyl, 1,3,6,9-tetraoxaundecyl, 1,3,6,9-tetraoxatridecyl, 1,3,6,9-tetraoxa-10-phenyldecyl, 1,3,6,9-tetraoxa-10-hydroxydecyl, phenyl, $C_1$–$C_{22}$-alkoxy, $C_1$–$C_{10}$-alkylthio, cyano, $C_1$–$C_{16}$-mono- or $C_1$–$C_{16}$-dialkylamino, 1-azacycloalkyl, chlorine, bromine, hydroxysulfonyl, phenylthio or the radical

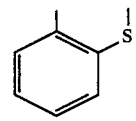

3. The naphtholactamsquaric acid dye as claimed in claim 1, wherein $R^1$ and $R^2$ are each $C_{12}$–$C_{22}$-alkyl, benzyl, undec-10-en-1-yl, 3,6-dioxahexyl, 3,6-dioxaheptyl, 3,6-dioxadecyl, 3,6-dioxa-7-phenylheptyl, 3,6,9-trioxadecyl, 3,6,9-trioxatridecyl or 8-hydroxyoctyl, and the rings A, B, C and D are unsubstituted.

4. The naphtholactamsquaric acid dye of the formula

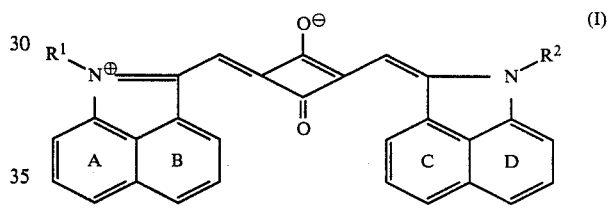

where $R^1$ and $R^2$ are each $C_6$–$C_{22}$-alkyl, undec-10-en-1-yl, benzyl, 3,6-dioxahexyl, 3,6-dioxaheptyl, 3,6-dioxadecyl, 3,6-dioxa-7-phenylheptyl, 3,6,9-trioxadecyl, 3,6,9-trioxatridecyl or 8-hydroxyoctyl.

5. An optical recording material in which information can be recorded and read by irradiation of the medium with laser light, comprising a base layer and a dye layer containing one or more naphtholactamsquaric acid dyes of the formula (I), or a base layer and a dye-containing layer of a thermoplastic or crosslinked polymer, wherein the polymer contains one or more naphtholactamsquaric acid dyes of the formula (I):

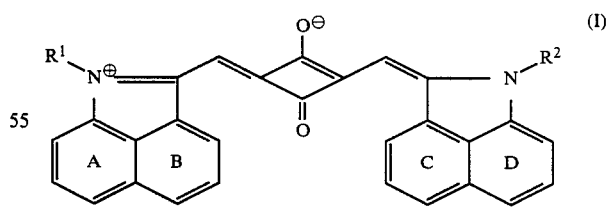

wherein $R^1$ and $R^2$ independently of one another are each (a) $C_3$–$C_{22}$-alkyl; (b) $C_3$–$C_{22}$-alkyl which is substituted by phenyl, halogen, $C_1$–$C_4$-alkanoyl, carboxyl, $C_1$–$C_4$-alkanoylamino, $C_1$–$C_4$-alkoxycarbonyl, $C_1$–$C_4$-alkoxycarbonylamino or $C_1$–$C_4$-alkylanilino in which $C_3$–$C_{22}$-alkyl chain is uninterrupted or is interrupted by oxygen atoms; (c) benzyl,2-phenylethyl or 2- or 3-phenylpropyl; (d) $C_5$–$C_7$-cycloalkyl; (e) $C_5$–$C_7$-cycloalkyl which is substituted by $C_1$–$C_4$-alkyl or halogen; or (f) phenyl, and the rings A, B, C and D are unsubstituted or substituted by $C_1$–$C_{22}$-alkyl, which are unsubstituted or substituted by phenyl, halogen, $C_1$–$C_4$-alkanoyl, carboxyl, $C_1$–$C_4$-alkanoylamino, $C_1$–$C_4$-alkoxycarbonyl; $C_1$–$C_4$-alkoxycarbonylamino or $C_1$–$C_4$-alkylanilino, or are substituted by phenyl, $C_1$–$C_{22}$-alkoxy, $C_1$–$C_{20}$-alkylthio, halogen, nitro, cyano, $C_1$–$C_4$-mono- or a dialkylamino, 1-azacycloalkyl, $C_1$–$C_4$-alkyl sulfonyl, $C_1$–$C_4$-alkoxysulfonyl, phenylsulfonyl, $C_1$–$C_4$-alkylphenylsulfonyl, hydroxysulfonyl, anilino, $C_1$–$C_4$-alkylanilino, $C_1$–$C_4$-alkanoyl, $C_1$–$C_4$-alkanoylamino, $C_1$–$C_4$-alkoxycarbonyl, $C_1$–$C_4$-alkoxycarbonylamino, carbamyl, $C_1$–$C_4$-N-mono- or $C_1$–$C_4$-N, N-dialkylcarbamyl, sulfamyl, $C_1$–$C_4$-N-mono- or N,N-$C_1$–$C_4$-dialkyl sulfamyl, ureido, $C_1$–$C_4$-alkyl-substituted ureido, phenoxy, phenylthio or the radical:

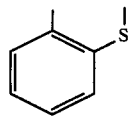

* * * * *